Sept. 15, 1925.

Re. 16,163

J. EPPS

LOOM BOBBIN HOLDER

Original Filed Feb. 6, 1923

Inventor

J. Epps,

By Clarence A. O'Brien

Attorney

Reissued Sept. 15, 1925. Re. 16,163

UNITED STATES PATENT OFFICE.

JOSEPH EPPS, OF WILLIAMSTON, SOUTH CAROLINA, ASSIGNOR OF ONE-HALF TO T. I. BARBER, OF WILLIAMSTON, SOUTH CAROLINA.

LOOM-BOBBIN HOLDER.

Original No. 1,487,512, dated March 18, 1924, Serial No. 617,241, filed February 6, 1923. Application for reissue filed June 8, 1925. Serial No. 35,811.

*To all whom it may concern:*

Be it known that I, JOSEPH EPPS, a citizen of the United States, residing at Williamston, in the county of Anderson and State of South Carolina, have invented certain new and useful Improvements in a Loom-Bobbin Holder, of which the following is a specification.

An object of the invention resides in providing a bobbin holder for bobbin batteries of looms which has the yieldable latch member projecting partially across the discharge opening of the battery for yieldably supporting the bobbins in the battery, and yet permitting the forcible discharge of a bobbin in the usual operation of the loom for filling a shuttle and for preventing accidental discharge of the bobbins from said battery.

A further object of the invention resides in providing a yieldable bobbin holder having means to permit the adjustment of the projection of the latch member relative to the bracket member for adapting a single holder to use on different looms having variations in the structure of the bobbin batteries, so that the latch member may be projected the proper distance across the discharge opening of the battery for proper cooperation with the bobbins in said battery to yieldably support the same.

A further object of the invention resides in the provision of such a holder which is comparatively simple of construction, inexpensive of manufacture, and of such a nature as to be readily attached to conventional types of bobbin batteries employed in conjunction with weaving machines.

The nature and advantages of the invention will be better understood when the following detailed description is read in connection with the accompanying drawings, the invention residing in the construction, combination, and arrangement of parts as claimed.

In the drawings, forming part of this application, like numerals of reference indicate similar parts in the several views; and wherein:—

Figure 1:
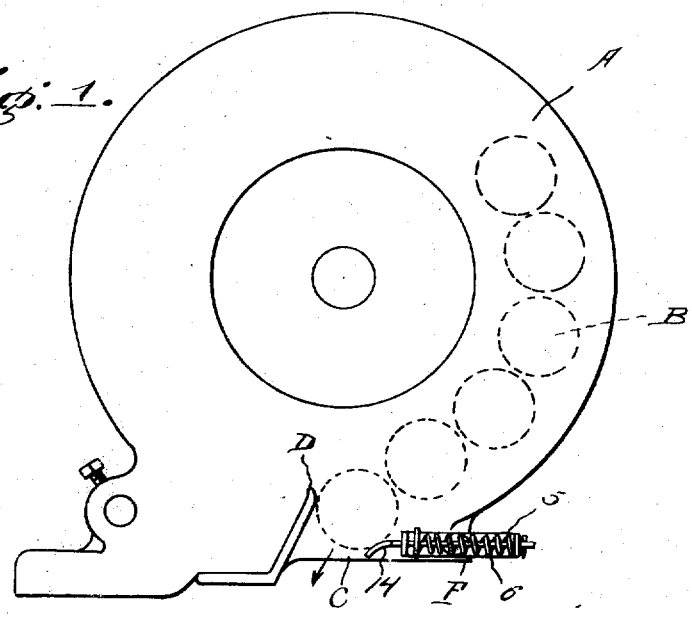
Figure 1 is an inside end elevational view of a conventional type bobbin battery, showing my improved holder mounted thereon.

Referring to the drawings in detail, and particularly to Figure 1, there is shown a bobbin battery A of usual construction adapted for receiving therein the multiplicity of bobbins B. This battery A is in the form of a drum-shaped casing, and is provided at its bottom side with the usual bobbin outlet C, together with the bobbin guide D forwardly of this outlet. The casing constituting the battery is formed behind the outlet opening C with an extension E, in the form of a web, and to this extension is secured my improved holder designated in general by the numeral 5.

Figure 2:
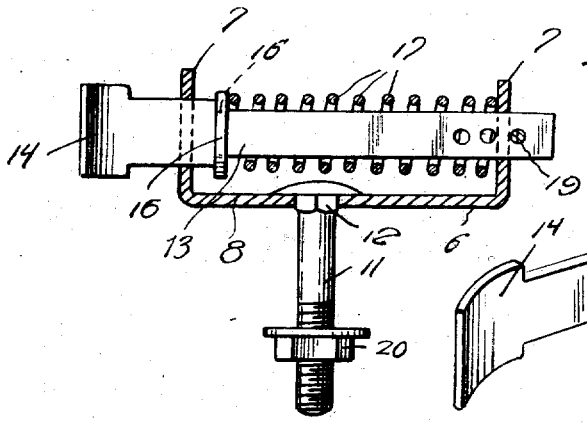
Figure 2 is a vertical longitudinal cross sectional view through my holder per se.
Figure 3:
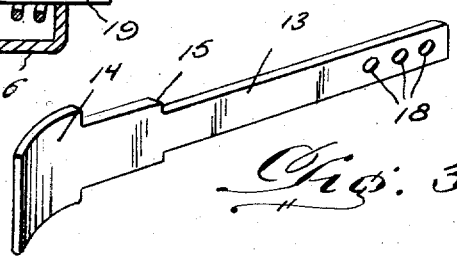
Figure 3 is a perspective view of the sliding bolt member forming a part of my invention.
Figure 4:
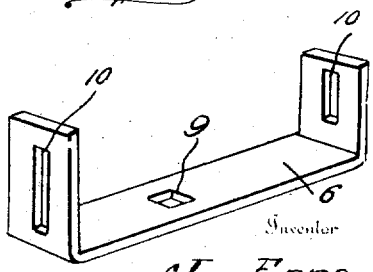
Figure 4 is a similar view of the sliding bolt and keeper.

With reference particularly to Figures 2, 3, and 4, it will be noted that the improved bobbin holder, includes a bracket member 6 formed of a strip of material bent into U-shape to provide a pair of parallel legs 7 joined by the connecting portion 8. The bracket member is formed at 9, in the portion 8 with a square opening, while the legs 7 are formed with longitudinally extending slots 10 for a purpose which will now be described. The bracket member receives a bolt 11 having a squared portion 12 adjacent the head, which fits in the square opening 9, so that when the bolt is mounted in the opening in the web of the bobbin battery, the bracket member will be securely fastened thereon and held against rotation on the bolt by the squared portion 12.

Extending longitudinally of the keeper 6 is a sliding latch bolt 13, which is slidably disposed within the said slots 10 of the end legs 7 of the keeper 6. One end of this sliding latch bolt 13 is formed with a head or plate 14, which is curved downwardly, as clearly shown in Figures 1 and 3. The latch member 13 is made of strip material and has the edge portions cut away to form the shoulders 15 at the opposite edges of the member. A washer plate 16 is formed with a central opening so that it may be fitted on the latch member and engage the shoulders. A coil spring 17 is mounted on the latch member between the plate 16 and one leg of the bracket member and is normally held under compression. The end of this member 13 opposite from the head or plate 14 may be and preferably is, provided with a plurality of spaced openings 18, for the reception of a cotter pin 19 adapted to engage one leg of the bracket member for adjustably mounting the projection of the latch member into the discharge opening of the bobbin battery, in a predetermined manner, so that adjustment may be made for different sized bobbins used in one loom or when the invention is to be applied to other looms.

Referring particularly to Figure 1, it will be seen that the extension web of the battery A is formed with an opening through which is inserted the bolt 12 of my bobbin holder, the same being rigidly secured through the instrumentality of a nut 20. When my holder is positioned as shown in this figure, it will be seen that the head 14 of the latch bolt 13 will be normally projected by the coil spring 17, partially across the discharge opening C of the bobbin battery to a point determined by the adjustment of the cotter pin 19, so that it will yieldably engage and support the lowermost bobbin in the battery and prevent the accidental discharge thereof, and yet will readily yield to the forcible discharge of the bobbin by the means provided for this purpose.

The adjustability of the operative position of the latch member relative to the bracket member provides a construction which permits the application of the device to different looms and the projection of the latch member placed at the proper point, or the adjustment of the latch member on one loom, when the size of the bobbin is changed to properly cooperate in the support of the different sized bobbin. The provision of the bracket and latch members formed of sheet material, provides a structure which may be manufactured at small cost and yet operate efficiently.

Although I have herein shown and described the preferred embodiment of the present invention, it is nevertheless to be understood that minor changes may be made therein, without departing from the spirit and scope of the invention as claimed.

Having thus described my invention, what I claim as new and desire to secure by Letters Patent is:

1. The combination with the bobbin battery of a weaving machine having an outlet opening for the bobbin, of a bobbin holder including a U-shaped bracket member formed with openings in the parallel leg portions thereof, a latch member slidably mounted in the opening of the bracket member having a shoulder formed thereon, a resilient member engaging the shoulder on the latch member and the bracket member for projecting the latch member into the opening in the bobbin battery, and means adjustably controlling the projection of the latch member in a predetermined manner.

2. A bobbin holder for bobbin batteries of weaving machines, comprising a stationary support on said bobbin battery, a latch member slidably mounted on the support and resiliently projected into the outlet opening of the bobbin battery, said latch member being formed with a plurality of openings arranged in a predetermined manner, and means adapted to be mounted in any one of said openings in said latch member for engaging said support and limiting the projection of the latch member into said outlet opening.

3. A bobbin holding attachment for bobbin batteries of weaving machines having outlet openings comprising a U-shaped bracket member detachably mounted on the bobbin battery, a latch member slidably mounted in the legs of the bracket member having a shoulder thereon normally between the legs, a resilient member engaging the shoulder at one end and one of the legs at the opposite end for normally projecting the latch member into the outlet opening of the bobbin battery, and means for adjustably controlling the projection of the latch member into the outlet opening.

4. A bobbin holding attachment for bobbin batteries of weaving machines, said batteries having outlet openings comprising a U-shaped bracket member detachably mounted on the bobbin battery, a latch member slidably mounted in the legs of the bracket member, resilient means engaging the bracket member and the latch member for normally projecting the latch member into the discharge opening, and means adjustably mounted on the latch member, for cooperation with the bracket member for predetermining the projection of said latch member by the resilient means.

5. A bobbin holding attachment for bobbin batteries of weaving machines wherein said batteries have outlet openings comprising a U-shaped bracket member formed of sheet material detachably secured to the bobbin battery, a latch member formed of strip material slidably mounted in the leg portions of the bracket member, said latch member having a shouldered portion between the legs of the bracket member, resilient means mounted on the latch member between the shouldered portions and one leg of the bracket member for normally projecting the latch member into the outlet opening of the bobbin battery, and means adjustably mounted on the latch member for limiting the projection thereof in a predetermined manner.

In testimony whereof I hereunto affix my signature.

JOSEPH EPPS.